United States Patent
Gilmer et al.

(10) Patent No.: US 11,408,361 B2
(45) Date of Patent: Aug. 9, 2022

(54) CHARGE AIR COOLER DRAIN SYSTEM

(71) Applicant: Dayco IP Holdings, LLC, Troy, MI (US)

(72) Inventors: Matthew C. Gilmer, South Lyon, MI (US); James H. Miller, Ortonville, MI (US); Russell Aach, Lapeer, MI (US); Chester E. Duffield, III, Warren, MI (US); Scott Martin, Lake Orion, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 17/352,617

(22) Filed: Jun. 21, 2021

(65) Prior Publication Data

US 2021/0404395 A1 Dec. 30, 2021

Related U.S. Application Data

(60) Provisional application No. 63/043,876, filed on Jun. 25, 2020.

(51) Int. Cl.
*F02B 37/16* (2006.01)
*F02B 29/04* (2006.01)
(Continued)

(52) U.S. Cl.
CPC ...... *F02D 41/0007* (2013.01); *F02B 29/0468* (2013.01); *F02B 37/16* (2013.01); *F02M 31/20* (2013.01)

(58) Field of Classification Search
CPC ...... F02B 37/16; F02B 29/04; F02B 29/0468; F02B 29/0418
See application file for complete search history.

(56) References Cited

U.S. PATENT DOCUMENTS

| 7,007,680 B2 | 3/2006 | Fussing et al. |
| 7,980,076 B2 | 7/2011 | Buia et al. |

(Continued)

FOREIGN PATENT DOCUMENTS

| DE | 102016214076 A1 | 2/2018 | |
| WO | WO-2015098550 A1 * | 7/2015 | ............. F02M 26/06 |

(Continued)

OTHER PUBLICATIONS

Machine generated English translation of WO 2015098550 A1.*

(Continued)

*Primary Examiner* — Ngoc T Nguyen
(74) *Attorney, Agent, or Firm* — FisherBroyles, LLP; Susan M. Oiler

(57) ABSTRACT

An internal combustion engine having an intake manifold, a compressor in fluid communication with the intake manifold, a charge air cooler in fluid communication with and between the compressor and the intake manifold, a throttle controlling fluid communication between the air charge cooler and the intake manifold, and a condensate collection reservoir that collects condensate from the air charge cooler and is in fluid communication with a suction port of a Venturi device in a bypass loop around the throttle. A motive inlet of the Venturi device is in fluid communication upstream of the throttle and a discharge outlet is in fluid communication downstream of the throttle, and under operating conditions that provide an adequate pressure drop across the Venturi device, the suction port draws condensate from the condensate collection reservoir and introduces the condensate into the intake manifold as a mist.

11 Claims, 1 Drawing Sheet

(51) Int. Cl.
    *F02D 41/00*    (2006.01)
    *F02M 31/20*    (2006.01)

(56) References Cited

U.S. PATENT DOCUMENTS

| | | | |
|---|---|---|---|
| 8,191,366 B2 | 6/2012 | Taylor | |
| 9,181,852 B2* | 11/2015 | Yamada | F02M 25/028 |
| 9,334,791 B2 | 5/2016 | Glugla et al. | |
| 9,546,590 B2* | 1/2017 | Radmard | F02B 29/0475 |
| 2014/0290630 A1 | 10/2014 | Pursifull | |
| 2014/0325979 A1* | 11/2014 | Morelli | F02B 29/04 |
| | | | 60/599 |
| 2018/0245546 A1 | 8/2018 | Haga | |
| 2018/0283307 A1* | 10/2018 | Dudar | F02D 41/222 |

FOREIGN PATENT DOCUMENTS

| | | |
|---|---|---|
| WO | 2018183059 A1 | 10/2018 |
| WO | 2019022177 A1 | 1/2019 |

OTHER PUBLICATIONS

PCT, International Search Report and Written Opinion, International Application No. PCT/US2021/038186 (dated Sep. 28, 2021) (8 pages).

\* cited by examiner

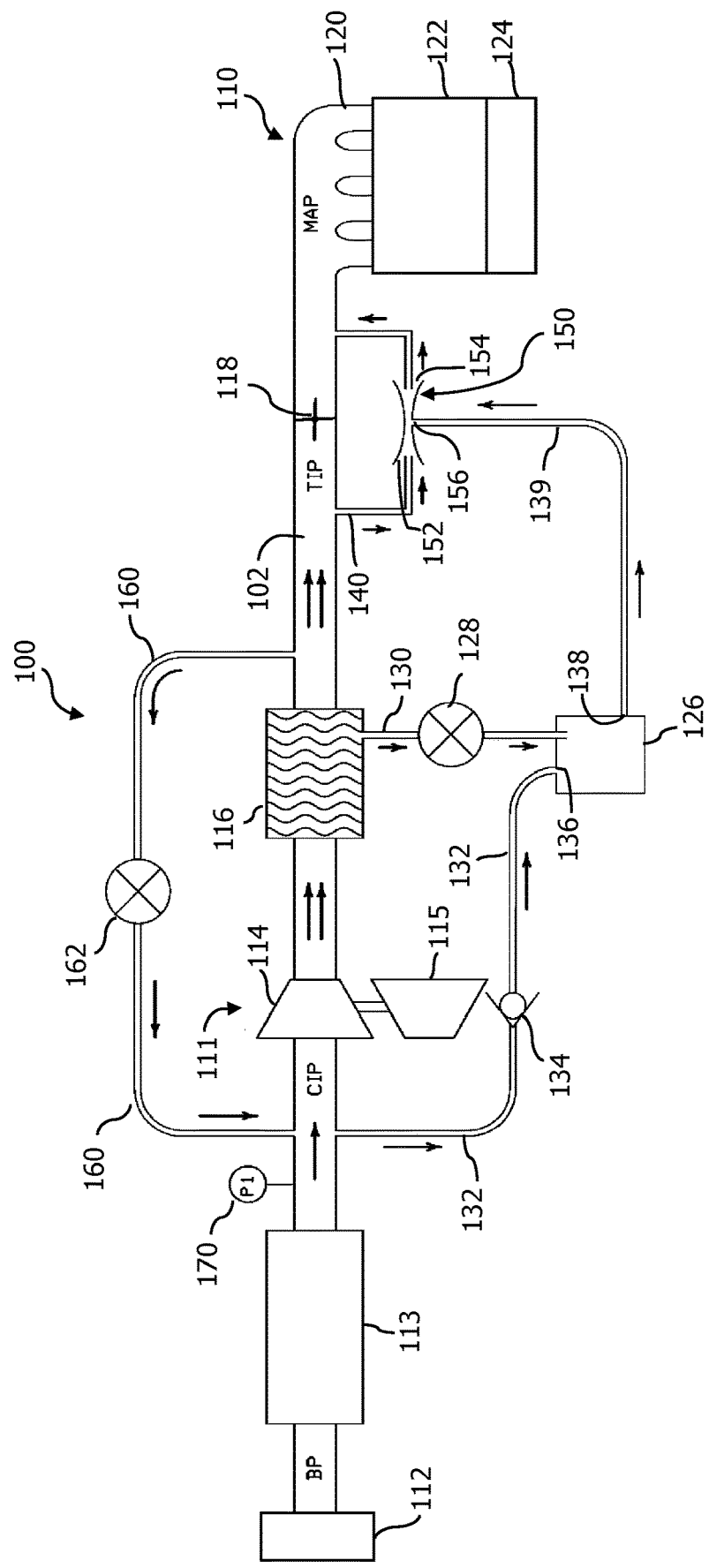

CHARGE AIR COOLER DRAIN SYSTEM

RELATED APPLICATIONS

This application claims the benefit of U.S. Provisional Application No. 63/043,876, filed Jun. 25, 2020, the entirety of which is incorporated herein by reference.

TECHNICAL FIELD

This application relates to a charge air cooler drain system, more particularly, to such a system that introduces water from the charge air cooler into the combustion engine as a mist from a Venturi device.

BACKGROUND

Many internal combustion engines include turbochargers or superchargers. Turbo chargers and superchargers force more air mass ("boosted air") into an engine's intake manifold and combustion chamber using a compressor to compress the air. This compression of the intake air tends to heat the air. A charge air cooler is typically present in the engine system to cool the heated air before entering the intake manifold to a temperature suitable for maximum power from the combustion process within the engine. A decrease in air intake temperature provides a denser intake charge to the engine and allows more air and fuel to be combusted per engine cycle, increasing the output of the engine. This cooling process can produce moisture (condensate) from the heated air.

Depending on engine conditions and run time, the amount of condensate produced by an engine can vary. According to U.S. Pat. No. 9,181,852, on a humid day while cruising at 70 mph for 60 min, the puddle of water accumulated in the charge air cooler can be at a rate of 120 cc/60 min. An engine can misfire or experience a hydro-lock of the engine if a big puddle or "slug" of water is ingested into the engine during a hard acceleration. For example, misfire has been shown to occur from water ingestion rates of greater than 20 cc/sec.

There is a need to prevent water ingestion at rates high enough to cause misfire, but yet find an efficient, cost effective, space-saving device or system that reduces the condensate to small amounts and/or small droplets acceptable for introduction into the engine.

SUMMARY

In one aspect, an internal combustion engine system is disclosed that has an internal combustion engine having an intake manifold, a compressor, which provides boosted air, is in fluid communication with the intake manifold, a charge air cooler, which has a condensate collection reservoir, is in fluid communication with and between the compressor and the intake manifold, a throttle controlling fluid communication between the air charge cooler and the intake manifold, and a Venturi device in a bypass loop around the throttle. A motive inlet of the Venturi device is in fluid communication upstream of the throttle, a discharge outlet of the Venturi device is in fluid communication downstream of the throttle, and a suction port of the Venturi device is in fluid communication with the condensate collection reservoir of the charge air cooler. Under operating conditions that activate the Venturi device, the suction port draws condensate from the condensate collection reservoir and introduces the condensate into the intake manifold as a mist. The compressor is part of a turbocharger, supercharger, or the like.

In all aspects, the condensate collection reservoir includes a first valve controlling fluid flow between the charge air cooler and the condensate collection reservoir. The condensate collection reservoir is in fluid communication with air flow upstream of the compressor and a check valve controls the fluid communication therebetween.

In all aspects, the system can have a second valve in a relief loop around the compressor. The second valve controls fluid flow from downstream of the compressor to upstream of the compressor. The relief loop begins upstream of the throttle.

BRIEF DESCRIPTION OF THE DRAWINGS

FIG. 1 is a schematic illustration of a turbocharged engine having a charge air cooler drain system in fluid communication with a Venturi device.

DETAILED DESCRIPTION

The following description and drawings are illustrative and are not to be construed as limiting. In the drawings, like reference numbers indicate identical or functionally similar elements. Numerous specific details are described to provide a thorough understanding of the disclosure.

As used herein, "fluid" means any liquid, suspension, colloid, gas, plasma, or combinations thereof.

FIG. 1 is an engine schematic for an internal combustion engine system 100 that has a turbocharger or supercharger 111 in the system. The internal combustion engine system 100 is configured for combusting fuel vapor accumulated in at least one component thereof and includes a multi-cylinder internal combustion engine 110. The system 100 receives air from an air intake 112, which may include an air filter 113 (also known as an air cleaner), which flows downstream to the intake manifold 120 through a main conduit 102. The compressor 114 of the turbocharger 111 receives air from the air intake 112, compresses the air under action of a turbine within the turbine housing 115, and directs a flow of compressed air (or boosted air represented by the double arrows in FIG. 1) downstream through a charge air cooler or intercooler 116 and then to a throttle 118. The throttle 118 controls fluid communication between the compressor 114 and charge air cooler 116, and the intake manifold 120 of the engine 110. The throttle 118 is operable using known techniques to vary an amount of intake air provided to the intake manifold 120 and the cylinders of the engine. In FIG. 1 BP stands for barometric pressure, CIP stands for compressor input pressure, TIP stands for throttle input pressure, and MAP stands for manifold absolute pressure.

Intake manifold 120 is configured to supply intake air or an air-fuel mixture to a plurality of combustion chambers of engine 110 located within the engine block 122. The combustion chambers are typically arranged above a lubricant-filled crankcase 124 such that reciprocating pistons of the combustion chambers rotate a crankshaft (not shown) located in the crankcase 124.

Still referring to FIG. 1, the charge air cooler 116 is in fluid communication with and between the compressor 114 and the intake manifold 120 and has a condensate collection reservoir 126. The condensate collection reservoir 126 includes a first valve 128 controlling fluid flow from the charge air cooler 116 to the condensate collection reservoir 126. This fluid communication may be via a drain conduit 130 or may be built into the charge air cooler 116. The condensate collection reservoir 126, as its name implies, collects condensate (water) removed from the boosted air passing through the charge air intercooler 116 and maintains said condensate via the first valve 128 in the reservoir 126, thereby preventing the condensate from passing downstream to the intake manifold through the main conduit 102.

The condensate collection reservoir 126 is in fluid communication with air flow upstream of the compressor through an inlet conduit 132. A check valve 134 within the inlet conduit 132 or in the inlet port 136 of the condensate collection reservoir controls the fluid communication between the main conduit 102 and the condensate collection reservoir 126. The condensate collection reservoir 126 has an outlet conduit 139 in fluid communication with a suction port of a Venturi device 150 that is positioned in a bypass loop 140 around the throttle 118. The Venturi device 150 has a motive inlet 152 in fluid communication with the main conduit 102 upstream of the throttle 118, a discharge outlet 154 in fluid communication with the main conduit 102 downstream of the throttle 118, and the suction port 156 in fluid communication with the outlet port 138 of the condensate collection reservoir 126. The Venturi device may be constructed as disclosed in U.S. Pat. No. 9,827,963 or any other co-owned patents of the Applicant or other commercially available Venturi devices.

Still referring to FIG. 1, the internal combustion engine system 100 may also include a relief loop 160 around the compressor 114. The relief loop 160 includes a second valve 162. The second valve 162 controls fluid flow from downstream of the compressor 114, but upstream of the throttle 118, to upstream of the compressor 114. The system 100 may include any number of sensors, such as a pressure sensor 170 monitoring pressure within the main conduit 102 which is upstream of the compressor 114.

In operation, any time there is adequate delta pressure across the throttle, the pressures in the main conduit 102 activate the Venturi device 150, i.e., high pressure at the motive inlet 152 and low pressure at the discharge outlet 152. Under such conditions, suction is created via the suction port 156 to draw condensate from the condensate collection reservoir 126, which the Venturi device introduces into the intake manifold 120 as a mist. The mist has droplet sizes that can be introduced into the intake manifold without risk of damage to the engine. The system removes the condensate from the charge air intercooler 116 allowing the engine to operate at peak performance without ingesting a "slug" of water. The system 100 allows sub relative dew point temperatures to be achieved in the charge air cooler without the risk of condensate "pooling" in the charge air cooler 116.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to various embodiments thereof, it will be apparent that modifications and variations are possible without departing from the scope of the invention which is defined in the appended claims.

What is claimed is:

1. An internal combustion engine system comprising:
an internal combustion engine having an intake manifold;
a compressor in fluid communication with the intake manifold, the compressor providing boosted air to the intake manifold;
a charge air cooler in fluid communication with and between the compressor and the intake manifold, the charge air cooler having a condensate collection reservoir;
a throttle controlling fluid communication between the charge air cooler and the intake manifold; and
a Venturi device in a bypass loop around the throttle, wherein a motive inlet of the Venturi device is in fluid communication upstream of the throttle, a discharge outlet of the Venturi device is in fluid communication downstream of the throttle, and a suction port of the Venturi device is in fluid communication with the condensate collection reservoir of the charge air cooler;
wherein the condensate collection reservoir includes a first valve controlling fluid flow between the charge air cooler and the condensate collection reservoir;
wherein under operating conditions that activate the Venturi device, the suction port draws condensate from the condensate collection reservoir and introduces the condensate into the intake manifold as a mist.

2. The system as claimed in claim 1, wherein the condensate collection reservoir is in fluid communication with air flow upstream of the compressor and a check valve controls the fluid communication therebetween.

3. The system as claimed in claim 1, comprising a second valve in a relief loop around the compressor, the second valve controlling fluid flow from downstream of the compressor to upstream of the compressor.

4. The system as claimed in claim 3, wherein the relief loop begins upstream of the throttle.

5. The system as claimed in claim 1, wherein the compressor is part of a turbocharger or a supercharger.

6. The system as claimed in claim 1, comprising a pressure sensor positioned to sense the pressure in a main conduit upstream of the compressor.

7. An internal combustion engine system comprising:
an internal combustion engine having an intake manifold;
a compressor in fluid communication with the intake manifold, the compressor providing boosted air to the intake manifold;
a charge air cooler in fluid communication with and between the compressor and the intake manifold, the charge air cooler having a condensate collection reservoir;
a throttle controlling fluid communication between the charge air cooler and the intake manifold; and
a Venturi device in a bypass loop around the throttle, wherein a motive inlet of the Venturi device is in fluid communication upstream of the throttle, a discharge outlet of the Venturi device is in fluid communication downstream of the throttle, and a suction port of the Venturi device is in fluid communication with the condensate collection reservoir of the charge air cooler;
a second valve in a relief loop around the compressor, wherein the relief loop begins upstream of the throttle and the second valve controls fluid flow from downstream of the compressor to upstream of the compressor;
wherein under operating conditions that activate the Venturi device, the suction port draws condensate from the condensate collection reservoir and introduces the condensate into the intake manifold as a mist.

8. The system of claim 7, wherein the condensate collection reservoir includes a first valve controlling fluid flow between the charge air cooler and the condensate collection reservoir.

9. The system of claim 8, wherein the condensate collection reservoir is in fluid communication with air flow upstream of the compressor and a check valve controls the fluid communication therebetween.

10. The system as claimed in claim 7, wherein the compressor is part of a turbocharger or a supercharger.

11. The system as claimed in claim 7, comprising a pressure sensor positioned to sense the pressure in a main conduit upstream of the compressor.

* * * * *